United States Patent [19]
Salmon

[11] Patent Number: 5,391,120
[45] Date of Patent: Feb. 21, 1995

[54] TRANSMISSION BELT WITH INCORPORATED MOUNTING TENSION INDICATOR

[75] Inventor: Patrick Salmon, Laventie, France
[73] Assignee: Colmant Cuvelier, France
[21] Appl. No.: 53,272
[22] Filed: Apr. 28, 1993
[30] Foreign Application Priority Data Apr. 28, 1992 [FR] France ............................ 92 05221

[51] Int. Cl.⁶ .............................................. F16H 7/22
[52] U.S. Cl. ...................................... 474/102; 474/273
[58] Field of Search .............. 474/101, 102, 237, 265, 474/273; 198/626.4, 626.6, 813; 112/121.26; 73/762, 789, 806, 862.642, 862.636

[56] References Cited
U.S. PATENT DOCUMENTS 4,622,024 11/1986 Lawson ................................ 474/102
5,010,636 4/1991 Hall et al. ....................... 474/101 X
5,019,017 5/1991 Monch .................................. 474/102
5,078,655 1/1992 Brandenstein et al. ............. 474/102
5,181,890 1/1993 Robecchi ............................. 474/237

Primary Examiner—Roger J. Schoeppel
Attorney, Agent, or Firm—William A. Drucker

[57] ABSTRACT

Two guiding marks constituted by two parallel transversal marks are borne on the back of the belt, a number between said marks being indicated giving the length of the spacing required by the two markers when the belt is installed so that this belt is subjected to a suitable mounting tension. When the belt is installed, the latter is thus tensioned until the spacing of the marks reaches the given value which is simply checked by a meter rule.

The invention concerns the mounting of transmission belts.

4 Claims, 1 Drawing Sheet

TRANSMISSION BELT WITH INCORPORATED MOUNTING TENSION INDICATOR

FIELD OF THE INVENTION

The invention concerns transmission belts and more particularly the control of the mounting tension of these belts.

BACKGROUND OF THE INVENTION

When mounting a transmission belt between a leading member and a driven member, it is known that the value of the tension of the belt needs to be strictly observed so as to allow for full effectiveness whilst ensuring an optimal period of life of the belt.

Currently, checking of the mounting tension of a transmission belt requires special tooling which implies a delicate long procedure being needed to implement said belt.

SUMMARY OF THE INVENTION

The present invention is able to resolve this drawback and to this effect concerns incorporating in the transmission belt an indicator making it possible to easily and quickly check, without the need to use any special tool, that the mounting tension of this belt clearly corresponds to the ideal tension recommended by the manufacturer.

According to the invention, the belt has over its length, at a suitable location able to be seen by the user, such as the back of this belt, two marks spaced from each other and an indication of the length the spacing needs to have between the two marks so that the ideal mounting tension is obtained. This spacing value is calculated by the manufacturer according to the section, length and technical characteristics of the belt in question.

After having installed the belt, it can be readily understood that the user shall gradually tension the belt whilst measuring the crossing spacing between the two marks borne by this belt until the length value indicated on the belt corresponding to the recommended mounting tension is reached.

BRIEF DESCRIPTION OF THE DRAWINGS

So as to clearly understand the invention, there now follows a non-restrictive example of one preferred embodiment with reference to the accompanying diagrammatic drawing on which.

DETAILED DESCRIPTION OF THE PREFERRED EMBODIMENTS

Figure 1:
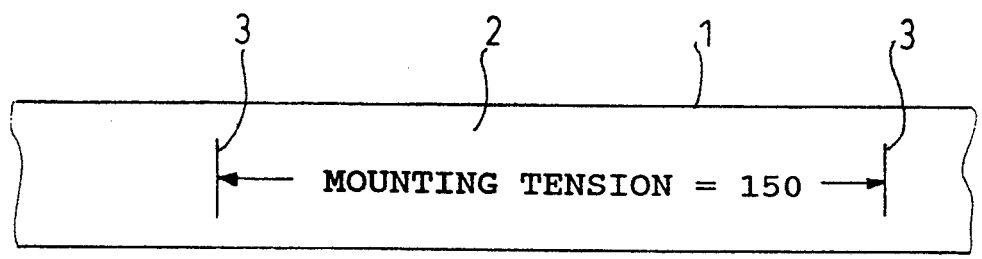
FIG. 1 is a front partial view of the back of a V-transmission belt comprising the mounting tension indicator of the invention, the belt being shown in its idle position.

With reference to the drawing, a V-transmission belt is shown partially at 1 on the back 2 of which two marks are borne constituted by two parallel transverse marks 3 between which the words "MOUNTING TENSION=150" is specified, these words indicating the length in mm the spacing needs to have between the two transverse marks 3 so that the belt 1 once installed is subjected to the appropriate mounting tension ensuring that the belt enjoys its optimal period of life.

Figure 2:
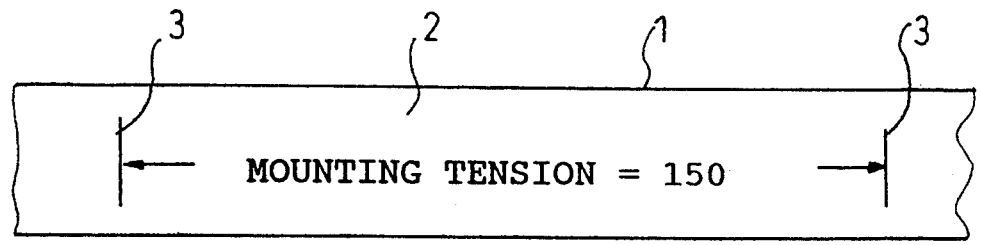
FIG. 2 is a view similar to that of FIG. 1 in which the recommended mounting tension is applied to the belt.
Figure 3:
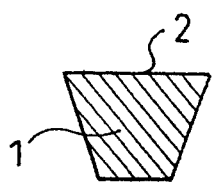
FIG. 3 is a vertical transverse cutaway view of the transmission belt of FIGS. 1 and 2.

The length value indicated at the back 2 of the belt 1 is clearly greater than the spacing of the marks 3 visible on FIG. 1 corresponding to the belt idle position. FIG. 2 shows the position of the belt 1 after installation and after its tension has been adjusted so that the spacing of the marks 3 reaches the recommended value of 150 mm, checking of correct adjustment then merely requiring the use of a meter rule.

It can be readily understood that the above-mentioned description has been given solely by way of simple non-restrictive example and constructive additions or modifications could be made without departing from the context of the invention. In particular, the spacing value of 150 mm constitutes a simple example and could clearly be any other according to the section, length and technical characteristics of the belt in question.

What is claimed:

1. Transmission belt with incorporated mounting tension indicator, wherein the belt has over its length two marks spaced from each other as well as an indication of a distance needed to separate said marks when the belt is being installed in order to apply to the belt a recommended initial tensioning, said indication of distance being according to the section, length and technical characteristics of the belt.

2. Belt according to claim 1, wherein said marks are contained on a back portion of the belt.

3. Belt according to claim 1, wherein it is constituted by a V-belt.

4. Belt according to claim 2, wherein it is constituted by a V-belt.

* * * * *